United States Patent [19]
Snyder et al.

[11] Patent Number: 5,597,167
[45] Date of Patent: Jan. 28, 1997

[54] BRUSH SEAL WITH FOOL PROOFING AND ANTI-ROTATION TAB

[75] Inventors: James G. Snyder, Newark, Ohio; Gregory H. Gernhardt, Old Saybrook, Conn.

[73] Assignee: United Technologies Corporation, Hartford, Conn.

[21] Appl. No.: 314,034

[22] Filed: Sep. 28, 1994

[51] Int. Cl.⁶ .................................................. F16J 15/48
[52] U.S. Cl. ................................................ 277/53; 277/136
[58] Field of Search .......................... 277/53, 136, 137, 277/188 R, 189, 55

[56] References Cited

U.S. PATENT DOCUMENTS

| | | | |
|---|---|---|---|
| 3,552,753 | 1/1971 | Mierley, Sr. | 277/137 |
| 5,066,025 | 11/1991 | Hanrahan | 277/53 |
| 5,090,710 | 2/1992 | Flower | 277/53 |
| 5,284,347 | 2/1994 | Pope | 277/53 |
| 5,351,971 | 10/1994 | Short | 277/53 |

FOREIGN PATENT DOCUMENTS 0816288  7/1959  United Kingdom ...................... 277/53

*Primary Examiner*—Daniel G. DePumpo

[57] ABSTRACT

A brush seal assembly includes a tab extending outward and engageable with a brush seal retainer. Various construction details are disclosed that provide a tab that prevents rotation of the brush seal during use and also prevents reverse installation of the brush seal assembly. In a particular embodiment, a brush seal assembly for installation within a carrier includes a tab that fits radially within a cut-out in a retaining means. Engagement with the cut-out prevents rotation. The tab extends outward from the low pressured side of the brush seal assembly. If installed in a reverse orientation, the tab engages the carrier to block installation of the retaining means.

18 Claims, 4 Drawing Sheets

BRUSH SEAL WITH FOOL PROOFING AND ANTI-ROTATION TAB

TECHNICAL FIELD

The present invention relates to brush seals, and more particularly to brush seals used in turbomachines.

Although the invention was developed in the field of aircraft engines it has application to other fields where brush seals are used to block fluid flow between a rotating and a stationary surface.

BACKGROUND OF THE INVENTION

A brush seal is a commonly used device for sealing between a rotating component, such as a shaft, and an adjacent stationary surface. The brush seal includes one or more arrays of brushes that are generally radial in orientation and extend between the rotating surface and the stationary surface. Each array of brushes is sandwiched between a backing plate and a side plate. The backing plate is on the lower pressure side and extends nearly the length of the brushes to prevent the bristles of the brushes from bending away from the high pressure side.

The bristles are typically angled slightly relative to the radial direction and away from the direction of rotation. This feature prevents buckling of the bristles during use and reduces wear. Another source of wear results from the rotation of the seal induced by contact with the rotating surface.

Reverse installation of the annular brush seals is also a contributor to wear and improper functioning of the seal. If installed backwards, the backing plate is on the high pressure side and therefore provides no support to prevent bending of the bristles into the low pressure side. This bending reduces the effectiveness of the sealing contact between the brush seal and the rotating surface. Further, the bristles will be angled into the direction of rotation and, as a result, buckling of the bristles will be encouraged rather than discouraged. This also contributes to reducing the effectiveness of the seal. In addition, the brush seal may not seat properly if installed backwards, which may lead to higher levels of vibration and increase the risk of damage to the seal.

Prior art devices to prevent reverse installation include provision of a pin that is received by an opening machined into the side plate of the brush seal but not the backing plate. Another prior art device includes a lip machined into the side plate that cooperates with a groove machined into the support structure. Brush seals are typically made by sandwiching the bristles between the side plate and the backing plate and then welding the sandwiched apparatus together. After bonding, the assembled brush seal is machined to form the opening or lip that is needed to prevent reverse installation.

A recent example of a brush seal assembly that prevents reverse installation is described in U.S. Pat. No. 5,066,025, issued to Hanrahan and entitled "Brush Seal Assembly". In this device, a recess is machined into the support structure that defines the carrier for the brush seal. The recess is sized to accept the shorter side plate but not the longer backing plate. Reverse installation will offset the axial position of the seal such that a retaining ring cannot be installed. Therefore, reverse installation is precluded without requiring special machining of the brush seal.

The above art notwithstanding, scientists and engineers under the direction of Applicants' Assignee are working to develop improved brush seals.

DISCLOSURE OF THE INVENTION

The present invention is predicated in part upon the recognition that machining the brush seal after fabrication weakens the weld bond between the brush stages and between the backing plates and sideplates. In effect, the machining of prior art brush seals to form a fool proofing lip on the brush seals removes a portion of the weld bond. The weakened brush seal is more susceptible to damage during use.

According to the present invention, a brush seal includes a tab that engages a brush seal retaining means to block rotation of the brush seal and prevent improper installation of the brush seal.

According to a specific embodiment of the present invention, the retaining means is a ring fixedly disposed on a carrier and having a cutout, and the brush seal includes a lip extending outward from the brush seal. The cut-out in the ring is sized to accommodate the lip such that engagement between the lip and the cut-out prevents rotation.

According to another specific embodiment, the retaining means is a vane assembly sideplate fastened to an adjacent vane assembly and having a cut-out, and the brush seal includes a lip extending outward from the bush seal. The cut-out in the sideplate is sized to accommodate the lip such that engagement between the lip and the cut-out prevents rotation.

According to another embodiment of the present invention, a method of installing a brush seal includes the steps of: inserting the brush seal into an annular spacing between the carrier and the rotating surface, engaging the retaining means with the brush seal such that the tab is disposed within the cut-out of the retaining means, and fastening the retaining means into a fixed relationship to the carder.

A principle feature of the present invention is the tab extending outward from the brush seal. This feature provides the advantage minimized wear of the brush seal by preventing rotation of the brush seal. The brushes of the brush seal are in sealing contact with the rotating surface. This contact encourages the annular brush seal to rotate in the direction of rotation of the rotating surface. The tab fits within a cut-out in the retaining means and engages the sides of the cut-out to block any significant rotational movement of the brush seal. Another advantage of the tab is that it foolproofs the installation of the brush seal. The tab is radially located such that if the brush seal were installed backwards, i.e. the backing plate facing the high pressure cavity, the tab interferes with the carrier. This interference prevents the retaining means from being engaged with both the carrier and the brush seal and, therefore, the brush seal cannot be fixedly retained by the retaining means.

A further advantage of the present invention is the increased durability of the brush seal as a result of the elimination of machining of the brush seal to produce the openings or lips used in the prior art. In addition, the present invention does not require machining of a recess or groove into the support structure. Elimination of this step minimizes the cost of the installation of brush seals.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
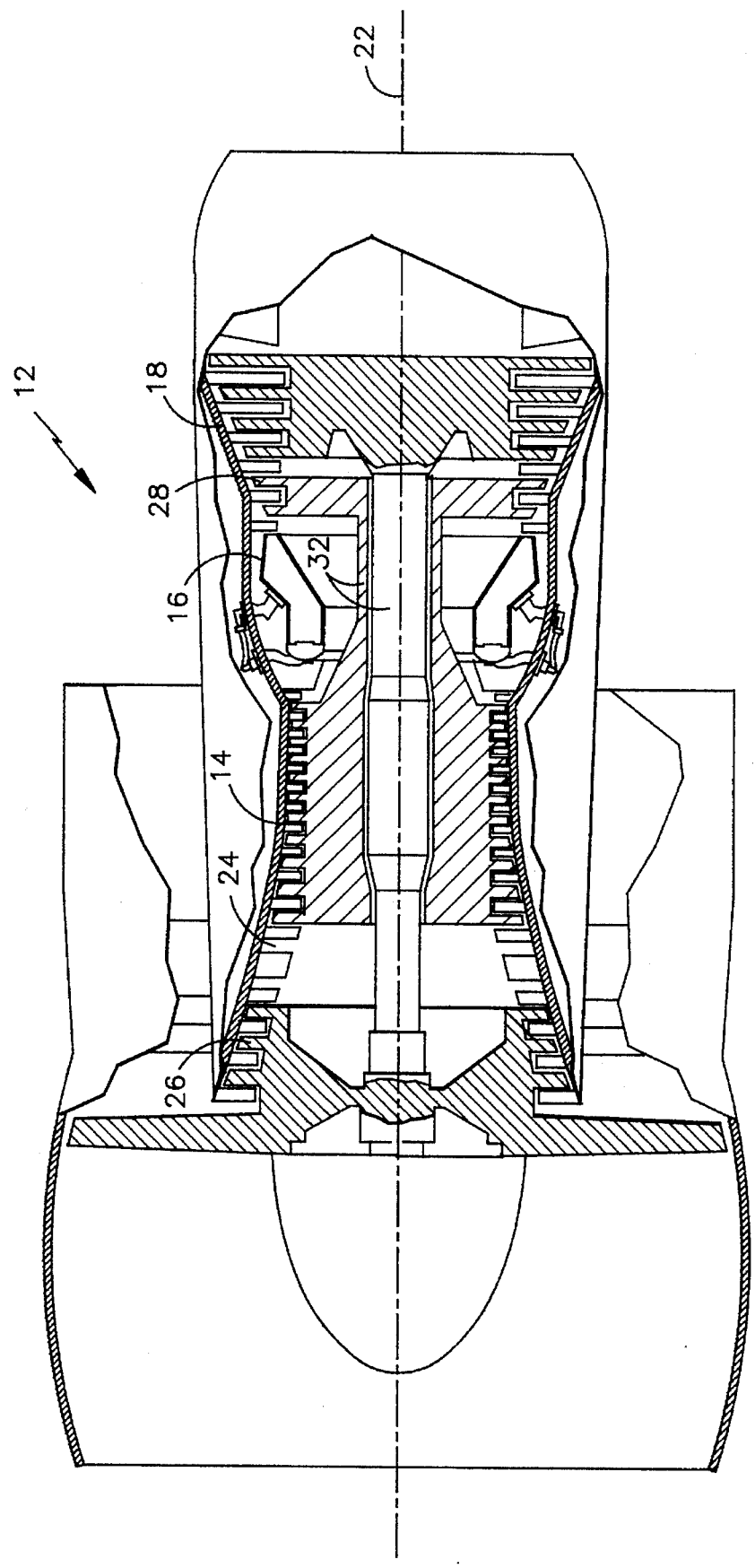
FIG. 1 is a cross-sectional side view of a gas turbine engine.
Figure 2:
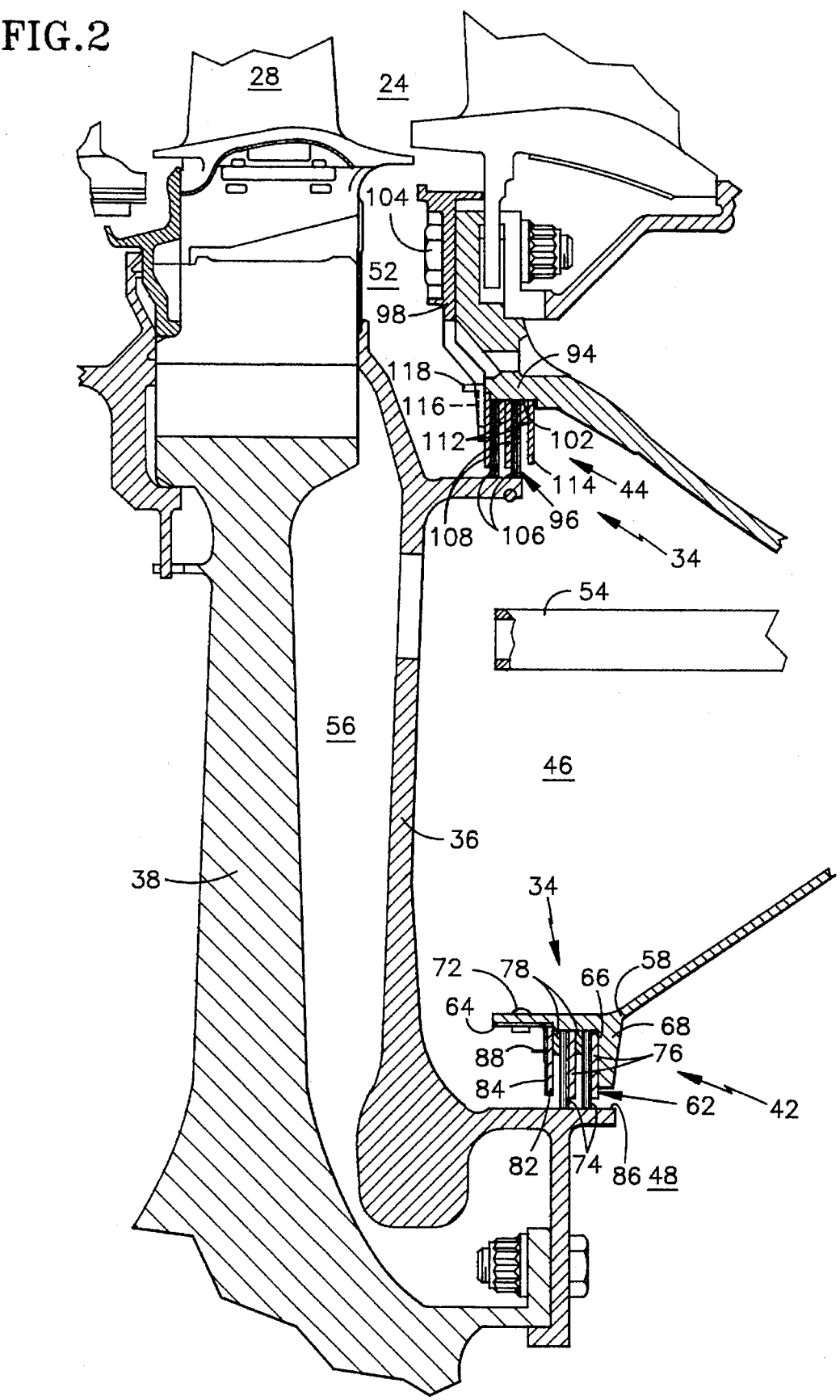
FIG. 2 is a sectioned, side view of rotor stage of the gas turbine engine.

Illustrated in FIG. 1 is a gas turbine engine 12 having a compressor 14, combustor 16, and turbine 18 disposed sequentially about a longitudinal axis 22 and having a flow path 24 extend therethrough. Working fluid flowing through the compressor 14 is engaged by a plurality of rotating compressor blades 26 to transfer energy to the working fluid. Within the combustor 16, fuel is mixed with the working fluid and the mixture is combusted. The working fluid, now consisting of the products of combustion, is then flowed through the turbine 18. Turbine rotor blades 28 within the turbine 18 remove energy form the working fluid. A portion of this energy is used to rotate the shafts 32 interconnecting the compressor 14 and turbine 18.

The high temperature associated with the combustion and the products of combustion may lead to damage to the components within the turbine 18. To reduce the likelihood of such damage occurring, cooling fluid is drawn from the compressor 14 and flowed into the turbine 18. This cooling fluid flows around the combustor 16 and thereby bypasses the transfer of heat from the combustion.

Sealing means 34 are used to ensure that the cooling fluid does not mix with the hot working fluid within the turbine 18 prior to cooling the turbine structural components. FIGS. 2—6 disclose sealing means 34 used in conjunction with a disk sideplate 36 to direct cooling fluid over a first stage rotor disk 38 and into an array of first stage rotor blades 28.

The sealing means 34 includes a radially inner brush seal assembly 42 and a radially outer brush seal assembly 44. The inner brush seal assembly 42 discourages fluid flow between a cooling cavity 46 and a radially inner cavity 48 defined by the separation between the shaft 32 and the adjacent turbine structure. The outer brush seal assembly 44 discourages fluid flow between the cooling cavity 46 and a vane cavity 52 disposed between the rotor blade assembly and an upstream vane assembly.

A tangential on-board injector 54 (TOBI) supplies cooling fluid into the cooling cavity 46. Cooling fluid flows from this cavity 46 into a disk cavity 56 defined by the axial separation of the disk sideplate 36 and the rotor disk 38. Passages (not shown) in the disk 38 and rotor blade 28 provide means for flowing cooling fluid through the disk 38 and rotor blade 28 to provide cooling of these structures.

Figure 3:
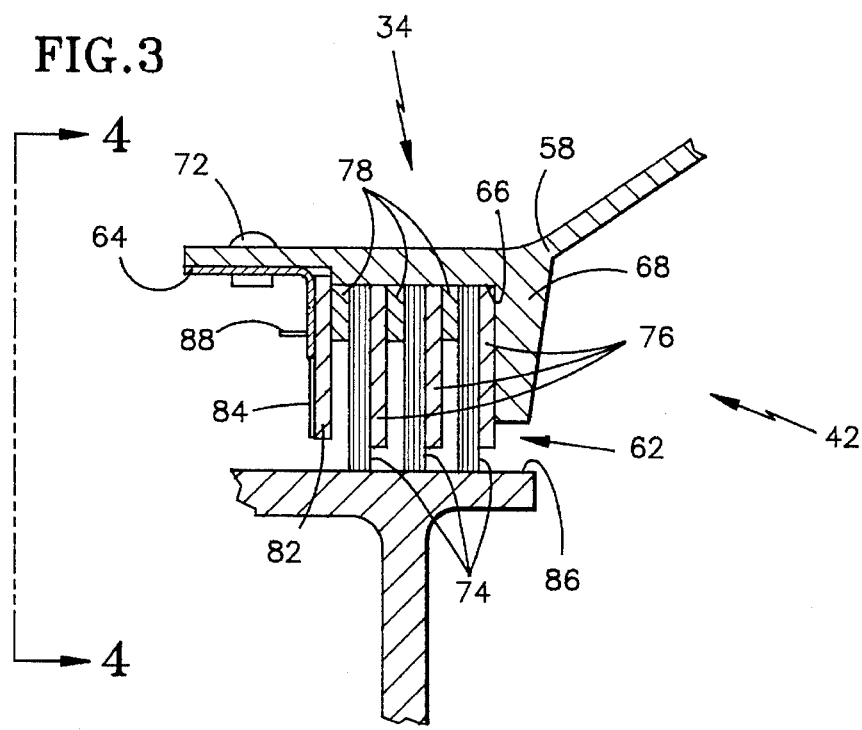
FIG. 3 is a sectional view of a brush seal having a anti-rotation tab.
Figure 4:
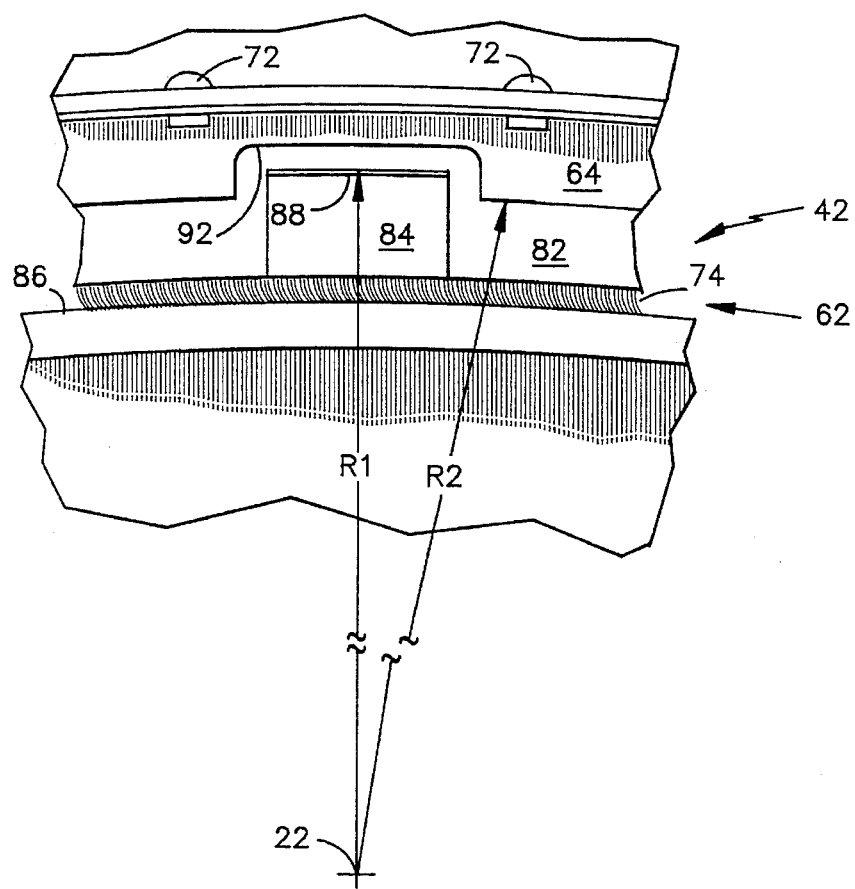
FIG. 4 is an axial view of the brush seal, taken along line 4—4 of FIG. 3.
Figure 5:
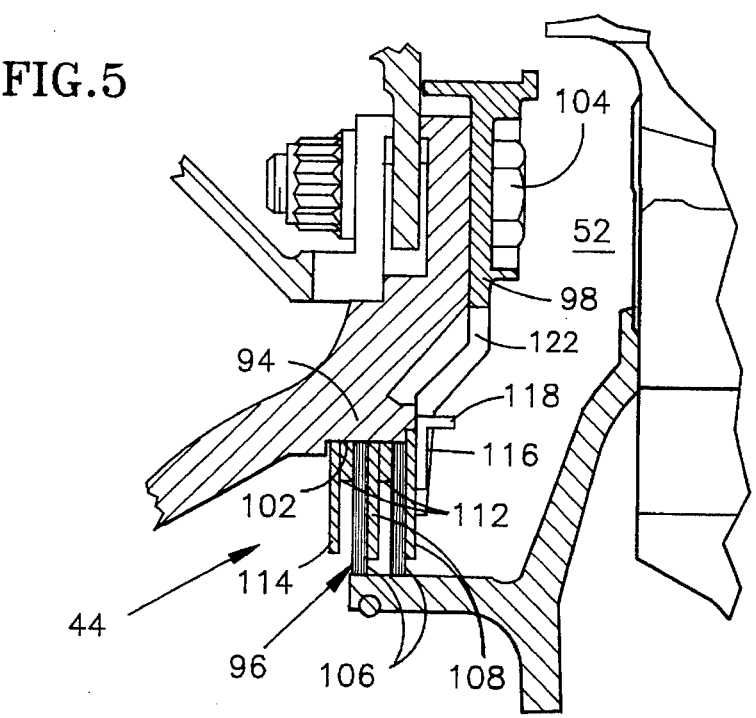
FIG. 5 is a sectional view of an alternate embodiment of a brush seal having an anti-rotation tab.

The inner brush seal assembly 42 is shown in more detail in FIG. 3. The inner brush seal assembly 42 includes a stationary carrier 58, a brush seal 62, and a retainer 64. The carrier 58 is an extension of the adjacent support structure and includes a seat 66 for the brush seal 62, a shoulder 68 that provides axial support to the brush seal 62, and a fastener 72. The brush seal 62 is disposed within the seat 66 and axially adjacent to the shoulder 68. A radially directed interference between the seat 66 and brush seal 62 results in a 'snap-fit'. The retainer 64 is disposed on the axially opposite side of the brush seal 62 from the shoulder 68 and, in conjunction with the shoulder 68, retains the brush seal 62 into its axial position. The retainer 64 is fixedly attached to the carrier 58 by engagement with the fastener 72.

The brush seal 62 includes three arrays of brushes 74, a combination of a backing plate 76 and a sideplate 78 for each array of brushes 74, a windage cover 82, and a tab 84. Each of the arrays of brushes 74 extends radially inward toward a rotating surface 86 and is angled (see FIG. 4) in the direction of rotation. The backing plates 76 and sideplates 78 are typical of those commonly used in conventional brush seals. The backing plates 76 are on the low pressure side and the sideplates 78 are on the high pressure side. The windage cover 82 faces into the cooling cavity 46. In this position, the windage cover 82 blocks the arrays of brush seals 62 from contact with cooling fluid that may be rotating about the annulus of the cooling cavity 46.

The tab 84 is L-shaped in cross-section such that a lip 88 is defined on the radially outer edge. The tab 84 is tack welded onto the windage cover 82 and extends radially outward to a radius R1 outward of the mean radius R2 of the retainer 64. To accommodate the radial extension of the tab 84, the retainer 64 includes a cut-out 92 extending radially and circumferentially about the tab 84.

The outer brush seal assembly 44 illustrates another embodiment of the present invention. The outer brush seal assembly 44 is shown in more detail in FIGS. 5 and 6. The outer brush seal assembly 44 includes a stationary carrier 94, a brush seal 96, and a plurality of vane cover plates 98. The carrier 94 is an extension of the adjacent support structure and includes a seat 102 for the brush seal 96. As with the inner brush seal assembly 42, a snap-fit exists between the brush seal 96 and the seat 102. The vane cover plates 98 are disposed on the low pressure side of the brush seal 96 to provide axial support to the brush seal 96 and, in conjunction with the carrier 94, retains the brush seal 96 into its axial position. The vane cover plates 98 are spaced circumferentially and each is fixedly attached to the carrier 94 by a mechanical fastener 104.

The outer brush seal assembly 44 includes two arrays of brushes 106, a combination of a backing plate 108 and a sideplate 112 for each array of brushes 106, a windage cover 114, and a tab 116. Each of the arrays of brushes 106 extends radially inward toward a rotating surface of the disk sideplate 36 and is angled (see FIG. 6) in the direction of rotation. The backing plates 108 are similar to those of the inner brush seal 62, except that the tab 116 is fixedly attached to the side of the backing plate 108 on the rotor disk 38 side. The windage cover 114 faces into the cooling cavity 46. As with the inner brush seal assembly 42, the windage cover 114 blocks the arrays of brushes 106 from contact with cooling fluid that may be rotating about the annulus of the cooling cavity 46.

Figure 6:
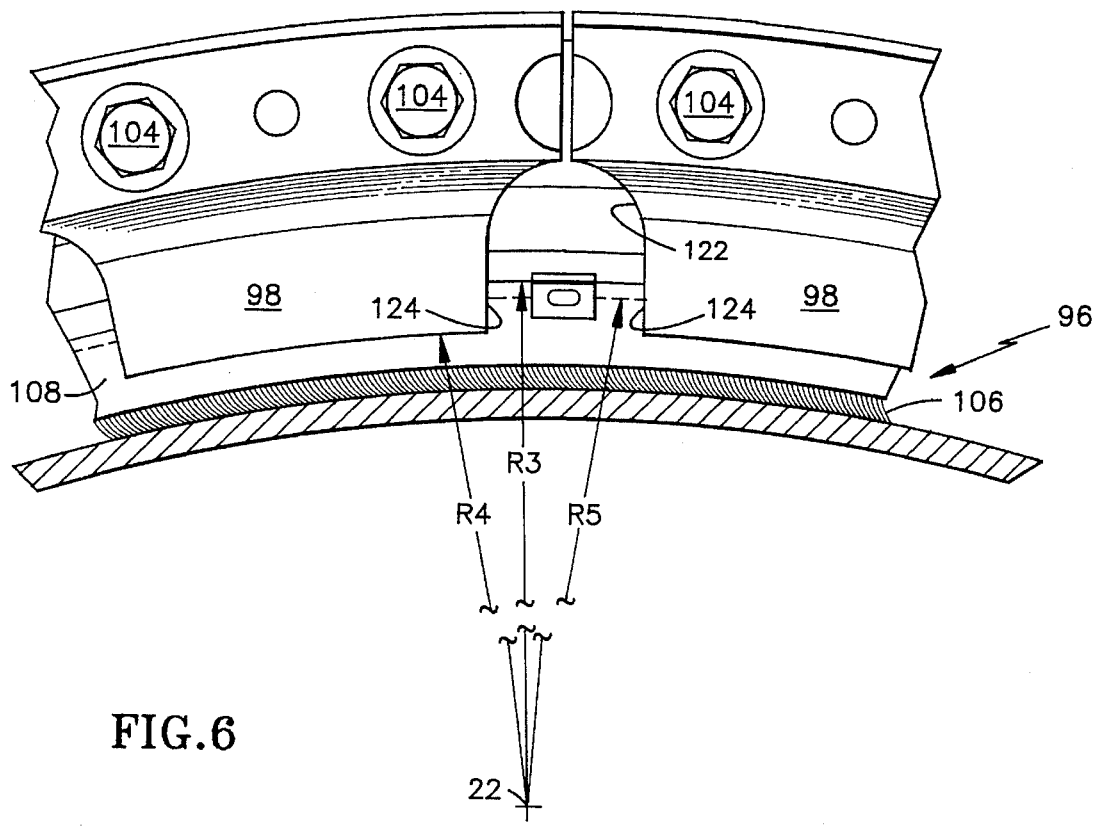
FIG. 6 is an axial view of the alternate embodiment of the brush seal, taken along line 6—6 of FIG. 5.

The tab 116 is also L-shaped in cross-section such that a lip 118 is defined on the radially outer edge. The tab 116 is tack welded onto the downstream backing plate 108 and extends radially outward to a radius R3 outward of the mean radius R4 of the vane cover plate 98 and also outward of the radius R5 of the carrier 94. To accommodate the radial extension of the tab 116, the vane cover plate 98 includes a cut-out 122 extending radially and circumferentially about the tab 116. As shown in FIG. 6, the cut-out 122 is defined by the adjacent scalloped comers 124 of the circumferentially spaced vane cover plates 98.

During operation of the gas turbine engine 12, cooling fluid is ejected from the TOBI 54 and flows into the cooling cavity 46. This cooling fluid has a positive pressure differential with the fluid within the vane cavity 52, the disk cavity 56, and the inner cavity 48. As a result, fluid is urged to escape through the inner brush seal and outer brush seal assemblies 42,44. The pressure differential between the cooling cavity 46 and the other cavities 48,52 presses the brush seals 62,96 in the downstream direction. For the inner brush seal 62, the shoulder 68 of the carrier 58 provides axial support against this force; for the outer brush seal 96, the vane cover plates 98 provide the axial support against this force.

As the shaft 32 and rotor disk 38 rotates, the bristles of the brush seals 62,96 are engaged by the rotating surfaces. This engagement produces a circumferential force on the brush seals 62,96. The circumferential force is reacted by the snap-fit arrangement of the brush seals 62, 96 and seats 66, 102 and by the tab 84 on the inner brush seal 62 seating against the side of the cut-out 92 of the retainer 64 and the tab 116 on the outer brush seal 96 seating against the side of the scalloped comer 124 of the vane cover plate 98. As a result of these engagements, the brush seals 62, 96 are prevented from rotating.

The brush seals are assembled into the support structure in the following manner. For the inner brush seal assembly 42, the brush seal 62 is oriented such that the backing plates 76 are on the side of the brush seal 62 facing the inner cavity 48. The brush seal 62 is inserted into position on the carrier 58 and seated against the shoulder 68 of the carrier 58. The retainer 64 is positioned over the windage cover 82 of the inner brush seal 62 such that the tab 84 and lip 88 are within the cut-out 92. The fastener 72 is then engaged with the retainer 64 and the carrier 58. In the event that the brush seal 62 is attempted to be installed backwards, i.e. with the backing plate 76 on the side of the brush seal 62 facing the cooling cavity 46, the lip 88 of the tab 84 will engage the shoulder 68 of the carrier 58 and thereby axially offset the brush seal 62 from the shoulder 68 of the carrier 58. This axial offset will prevent the retainer 64 from being engageable with the carrier 58 via the fastener 72.

For the outer brush seal assembly 44, the brush seal 96 is oriented such that the backing plates 108 are on the side of the brush seal 96 facing the vane cavity 52. The brush seal 96 is inserted into position on the carrier 94. The vane cover plate 98 is positioned over the downstream backing plate 108 of the outer brush seal 96 such that the tab 116 and lip 118 are within the cut-out 122. The fastener 104 is then engaged with the vane cover plate 98. In the event that the brush seal 96 is attempted to be installed backwards, i.e. with the backing plate 108 on the side of the brush seal 96 facing the cooling cavity 46, the lip 118 of the tab 116 will engage the support structure and prevent installation of the outer brush seal 96.

The retainer 64 and the vane cover plate 98 disclosed in FIGS. 2 to 6 are representative of retaining means that are engageable with the brush seals to fixedly retain the brush seals 62, 96 to the carriers 58,94. In addition, the quantity of brush seal arrays are shown as two for the outer brush seal 96 and three for the inner brush seal 62. It should be apparent to those skilled in the al that the invention is applicable to brush seals having one or more arrays of brushes.

Although the invention has been shown and described with respect to exemplary embodiments thereof, it should be understood by those skilled in the art that various changes, omissions, and additions may be made thereto, without departing from the spirit and scope of the invention.

What is claimed is:

1. A brush seal for discouraging fluid flow through an annular spacing between a stationay carrier and a rotating surface proximate to the carrier, the annular spacing disposed about a longitudinal axis and separating a first cavity and a second cavity, the first cavity having a higher pressure than the second cavity, the carrier including a retaining means being engageable with the brush seal and thereby fixedly retain the brush seal to the carrier with the brush seal in an installed condition, the brush seal including:

at least one brush stage, the brush stage including:
an array of brushes extending through the spacing;
a backing plate adjacent the side of the array of brushes, the backing plate facing the second cavity with the brush seal in the installed condition; and
a sideplate adjacent the opposite side of the array of brushes; and a tab disposed in a fixed relationship to the brush stage, the tab engaging the retaining means to block rotation of the brush stage about the longitudinal axis, and the tab extending outward from the brush seal, the tab being located such that if the brush seal is installed with the backing plate between the array of brushes and the first cavity, the tab interfaces with the carrier to thereby prevent fixed retention of the brush seal to the carrier by the retaining means.

2. The brush seal according to claim 1, wherein the retaining means is a ring fixedly disposed on the carrier and extending over the brush seal, and wherein the tab is disposed on the side of brush seal facing the first cavity.

3. The brush seal according to claim 1, wherein the retaining means is vane assembly sideplate, the vane assembly sideplate being fastened to an adjacent vane assembly and extending over the brush seal, wherein the tab is disposed on the side of the brush seal facing the second cavity.

4. The brush seal according to claim 1, wherein the tab includes a lip extending outward from the brush seal, wherein the retaining means includes a cut-out adapted to accommodate the lip such that engagement between the lip and cut-out blocks rotation of the brush seal about the longitudinal axis.

5. The brush seal according to claim 2, wherein the tab includes a lip extending outward from the brush seal, wherein the ring includes a cut-out adapted to accommodate the lip such that engagement between the lip and cut-out blocks rotation of the brush seal about the longitudinal axis.

6. The brush seal according to claim 3, wherein the tab includes a lip extending outward from the brush seal, wherein the vane assembly sideplate includes a cut-out adapted to accommodate the lip such that engagement between the lip and cut-out blocks rotation of the brush seal about the longitudinal axis.

7. A brush seal assembly for discouraging fluid flow through an annular spacing separating a first cavity from a second cavity, the annular spacing disposed about a longitudinal axis, the first cavity having a higher pressure than the second cavity, the brush seal assembly including a stationay carrier, a rotating surface proximate to the carrier, at least one brush stage, and a tab disposed in a fixed relationship to the brush stage, the carrier including a retaining means being engageable with the brush stage to thereby fixedly retain the brush stage to the carrier, the brush stage including an array of brushes extending through the spacing, a backing plate adjacent the side of the array of brushes, the backing plate facing the second cavity, and a sideplate adjacent the opposite side of the array of brushes, the tab engaging the retaining means to block rotation of the brush stage about the longitudinal axis, and the tab extending outward from the brush stage the tab being located such that if the brush stage is installed with the backing plate between the array of brushes and the first cavity the tab interfaces with the carrier to thereby prevent fixed retention of the brush seal to the carrier by the retaining means.

8. The brush seal assembly according to claim 7, wherein the retaining means is a ring fixedly disposed on the carrier and extending over the brush stage, and wherein the tab is disposed on the side of brush stage facing the first cavity.

9. The brush seal assembly according to claim 7, wherein the retaining means is vane assembly sideplate, the vane assembly sideplate being fastened to an adjacent vane assembly and extending over the brush stage, wherein the tab is disposed on the side of the brush stage facing the second cavity.

10. The brush seal assembly according to claim 7, wherein the tab includes a lip extending outward from the brush stage, wherein the retaining means includes a cut-out adapted to accommodate the lip such that engagement between the lip and cut-out blocks rotation of the brush stage about the longitudinal axis.

11. The brush seal assembly according to claim 8, wherein the tab includes a lip extending outward from the brush stage, wherein the ring includes a cut-out adapted to accommodate the lip such that engagement between the lip and cut-out blocks rotation of the brush stage about the longitudinal axis.

12. The brush seal assembly according to claim 9, wherein the tab includes a lip extending outward from the brush stage, wherein the vane assembly sideplate includes a cut-out adapted to accommodate the lip such that engagement between the lip and cut-out blocks rotation of the brush stage about the longitudinal axis.

13. A method to install a brush seal into a turbomachine, the turbomachine including a stationary carrier, a rotating surface proximate to the carrier, an annular spacing defined by the separation between the carrier and the rotating surface, the annular spacing disposed about a longitudinal axis and separating a first cavity and a second cavity, the first cavity having a higher pressure than the second cavity, the carrier including a retaining means being engageable with the brush seal to thereby fixedly retain the brush seal to the carrier with the brush seal in an installed condition, the retaining means having a cut-out, the brush seal including at least one brush stage and a tab disposed in a fixed relationship to the brush stage, the brush stage including an array of brushes extending through the spacing, a backing plate adjacent the side of the array of brushes, the backing plate facing the second cavity with the brush seal in the installed condition, and a sideplate adjacent the opposite side of the array of brushes, the tab engaging the cut-out of the retaining means to block rotation of the brush stage about the longitudinal axis, and the tab extending outward from the brush seal the tab being located such that if the brush seal is installed with the backing plate between the array of brushes and the first cavity the tab interferes with the carrier to thereby prevent fixed retention of the brush seal to the carrier by the retaining means, the method including the steps of:

inserting the brush stage into the annular spacing with the backing plate facing the second cavity;

engaging the retaining means with the brush seal such that the tab is disposed within the cut-out; and fastening the retaining means into a fixed relationship to the carrier.

14. The method according to claim 13, wherein the retaining means is a ting, wherein the step of engaging the retaining means with the brush seal includes engaging the ring with the side of the brush seal facing the first cavity, and wherein the step of fastening the retaining means includes fastening the ring directly to the carrier.

15. The method according to claim 13, wherein the retaining means is a vane assembly sideplate, wherein the step of engaging the retaining means with the brush seal includes engaging the vane assembly sideplate with the side of the brush seal facing the second cavity, and wherein the step of fastening the retaining means includes fastening the vane assembly sideplate to an adjacent vane assembly.

16. The method according to claims 13, wherein the retaining means includes a lip extending outward from the brush seal, and wherein the step of engaging the retaining means with the brush seal includes inserting the lip into cut-out.

17. The method according to claims 14, wherein the retaining means includes a lip extending outward from the brush seal, and wherein the step of engaging the retaining means with the brush seal includes inserting the lip into cut-out.

18. The method according to claims 15, wherein the retaining means includes a lip extending outward from the brush seal, and wherein the step of engaging the retaining means with the brush seal includes inserting the lip into cut-out.

* * * * *